US012607196B2

(12) United States Patent
Ndubueze et al.

(10) Patent No.: US 12,607,196 B2
(45) Date of Patent: Apr. 21, 2026

(54) SHAFT SEAL FOR AIRTIGHT ROTARY GUIDANCE OF A SHAFT THROUGH A WALL

(71) Applicant: BINDER GmbH, Tuttlingen (DE)

(72) Inventors: Emeka Ndubueze, Erdweg (DE); Kjell Deking, Dauchingen (DE)

(73) Assignee: BINDER GmbH, Tuttlingen (DE)

( * ) Notice: Subject to any disclaimer, the term of this patent is extended or adjusted under 35 U.S.C. 154(b) by 346 days.

(21) Appl. No.: 18/302,896

(22) Filed: Apr. 19, 2023

(65) Prior Publication Data

US 2023/0383966 A1 Nov. 30, 2023

(30) Foreign Application Priority Data

Apr. 22, 2022 (DE) .......................... 102022109718.8

(51) Int. Cl.
*F04D 29/10* (2006.01)
*F04D 25/08* (2006.01)
(Continued)

(52) U.S. Cl.
CPC ........... *F04D 29/102* (2013.01); *F04D 25/08* (2013.01); *B60K 17/24* (2013.01); *F16C 35/077* (2013.01)

(58) Field of Classification Search
CPC ..... F16C 35/077; B60K 17/24; F04D 29/102; F04D 25/08
(Continued)

(56) References Cited

U.S. PATENT DOCUMENTS 2,225,472 A 12/1940 Franklin
2,933,354 A * 4/1960 Primeau ................ F16C 27/066
384/536
(Continued)

FOREIGN PATENT DOCUMENTS

DE 102017113999 A1 12/2018
DE 102017116324 A1 1/2019
(Continued)

OTHER PUBLICATIONS

Sep. 19, 2023 Search Report issued in corresponding European patent application No. 23 168660.1 (with English language machine translation).
(Continued)

*Primary Examiner* — Thomas Fink
(74) *Attorney, Agent, or Firm* — Akerman LLP; Peter A. Chiabotti

(57) ABSTRACT

A climate chamber apparatus for airtight, rotatable guiding a shaft through an opening of a climate chamber wall can include a roller bearing for receiving the shaft and a one-piece seal of an elastic material. The one-piece seal can include a roller-bearing receiving section, with which the roller bearing is connected, a wall receiving section, and a flexible connection section which gaplessly connects the roller-bearing receiving section with the wall receiving section. Further, a climate chamber with a heating chamber wall, a ventilator disposed on the wall, where the ventilator includes a motor, disposed external to the wall and which drives across a shaft, guided through the wall, a fan impeller, wherein the wall includes an opening which is sealed airtight such that the shaft is guided airtight through the wall.

12 Claims, 1 Drawing Sheet

(51) Int. Cl.
    *B60K 17/24*         (2006.01)
    *F16C 35/077*       (2006.01)

(58) Field of Classification Search
    USPC .......... 277/391–393; 384/220, 525–536, 581
    See application file for complete search history.

(56)            References Cited

U.S. PATENT DOCUMENTS

| | | | |
|---|---|---|---|
| 3,372,960 A | 3/1968 | Fisher | |
| 3,961,829 A * | 6/1976 | Bowen | F16C 27/066 |
| | | | 384/536 |
| 4,722,618 A * | 2/1988 | Matsumoto | F16C 27/066 |
| | | | 384/535 |
| 5,275,558 A * | 1/1994 | Seney | A61C 1/055 |
| | | | 433/84 |
| 5,501,531 A * | 3/1996 | Hamaekers | F16C 27/066 |
| | | | 384/536 |
| 10,590,983 B2 * | 3/2020 | Dürre | F16C 27/066 |
| 11,421,733 B2 * | 8/2022 | Umezawa | F16C 19/527 |

| | | | |
|---|---|---|---|
| 2007/0065062 A1 * | 3/2007 | Roth | F16C 35/047 |
| | | | 384/536 |
| 2009/0214145 A1 * | 8/2009 | Cislo | F16C 27/066 |
| | | | 29/898.15 |
| 2011/0198110 A1 | 8/2011 | Fujita | |
| 2016/0195101 A1 | 7/2016 | Klink et al. | |
| 2020/0191205 A1 * | 6/2020 | Back | F16C 33/04 |

FOREIGN PATENT DOCUMENTS

| | | | |
|---|---|---|---|
| EP | 1077165 A2 | 2/2001 | |
| EP | 2878827 A1 | 6/2015 | |
| WO | 2008125792 A1 | 10/2008 | |
| WO | 2019016107 A1 | 1/2019 | |

OTHER PUBLICATIONS

Nov. 8, 2022 Office Action issued in corresponding German Application No. 102022109718.8 (with English language machine translation).

* cited by examiner

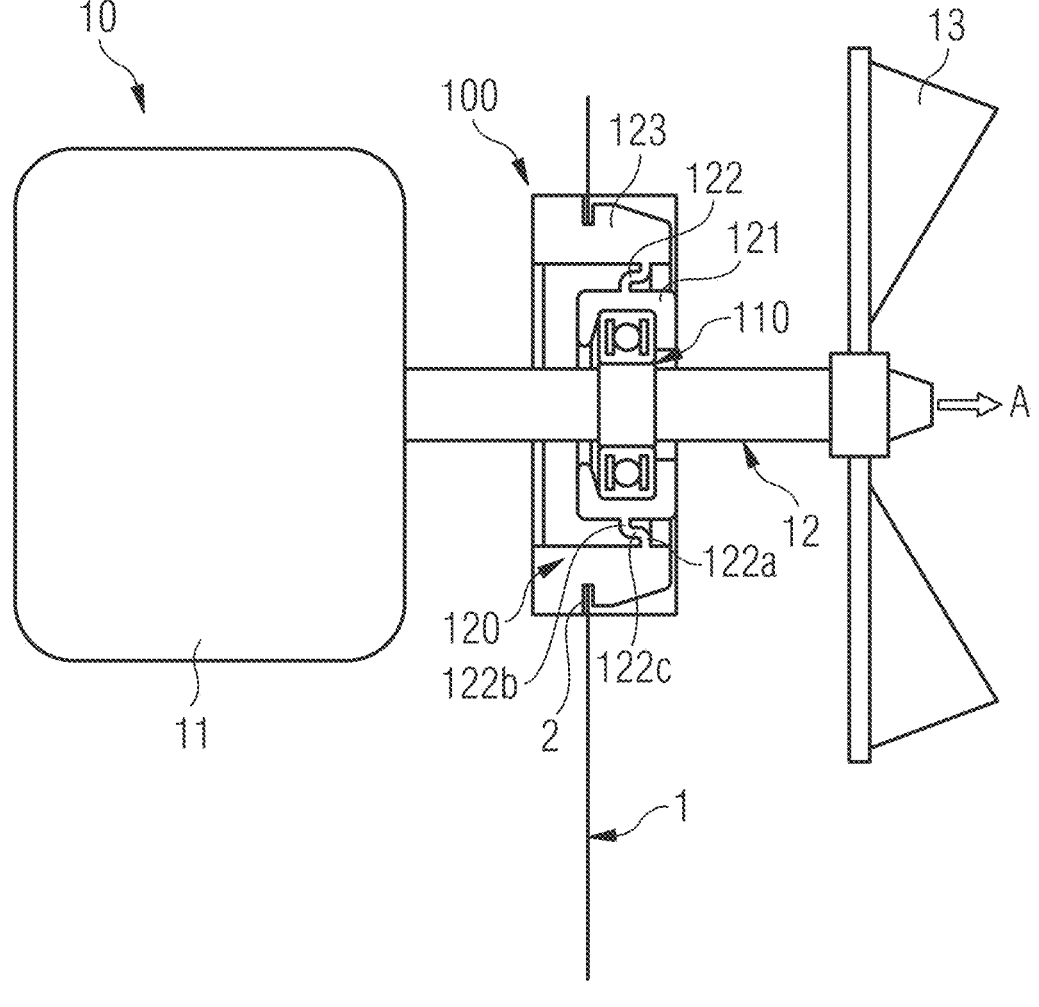

SHAFT SEAL FOR AIRTIGHT ROTARY GUIDANCE OF A SHAFT THROUGH A WALL

CROSS REFERENCE TO RELATED APPLICATIONS

This nonprovisional patent application claims priority to German Patent Application No. 10 2022 109 718.8, filed Apr. 22, 2022, the entirety of which is incorported herein by reference.

FIELD OF APPLICATION

The application relates to a shaft seal for airtight rotatable guiding a shaft through a wall and a climate chamber comprising such a shaft seal.

BACKGROUND

Such shaft seals are applied in climate chambers in the interior volume of which ventilators are to be operated in order to insure air circulation and in this way provide homogeneous distribution of humidity and temperature while, at the same time, the drive of the ventilator is intended to be placed outside of the climatized interior volume of the climate chamber, on the one hand for reasons of space, however, on the other hand, also to prevent motor waste heat from entering into the interior volume of the ventilator.

Accordingly, in such an application the shaft must be guided rotatable through an opening in a wall, in particular the heating chamber wall of the climate chamber since the motor is disposed outside and the ventilator impeller driven by the motor is disposed within the heating chamber. However, this opening must be sealed off in order to prevent, as best as is feasible, any air exchange between the work environment and the interior of the climate chamber, which otherwise would compromise the climate in the interior of the climate chamber.

Widely employed implementations of a shaft seal are shaft seal rings. As a rule, these are of annular structure, in particular of a metal, which are seated fixedly on the wall, in particular on the margin of the opening, and which comprise an elastic seal lip projecting into the interior volume of the ring. The seal lip can herein be pressed, for example by a spring element, radially onto the shaft surface in order to improve tightness. However, this construction is not capable of compensating deviations of coaxiality or concentricity. Furthermore, signs of wear and abrasion at the sealing surface are already evident after a short time and, in time, lead to increasingly severe tightness defects on the shaft.

SUMMARY

To avoid, or at least reduce, these problems, in some climate chambers by the applicant a different construction of a shaft seal is utilized. This construction also has an annular structure, in particular of a metal. In the inner volume of the ring a synthetic disk with a central bore in which runs the shaft is minimally pressed in such that a sealing effect is realized, however, simultaneously a certain movability of the disk within the ring is retained whereby coaxiality and/or concentricity deviations are compensated. However, in such shaft seals considerable frictional forces are active and great material abrasion, in particular of the synthetic disk, occur such that in his case the seal needs to be regularly renewed or be reworked by inserting a new synthetic disk.

The application addresses the problem of providing a shaft seal that exhibits only minimal wear, has good sealing effect and, moreover, is able to compensate coaxiality and/or concentricity deviations, as well as providing a climate chamber with such a shaft seal. This problem is resolved through a shaft seal as disclosed herein and a climate chamber as disclosed herein. The lead-through according to an embodiment serves for the airtight rotatable guiding of a shaft through an opening of a wall. The nominal direction of the shaft determines herein the axial direction, the radial direction(s) are determined by the connection lines between the shaft and the margin perpendicular to the axis.

The lead-through according to an embodiment comprises an antifriction or roller bearing for receiving the shaft and a one-piece seal of an elastic material.

The one-piece seal, for its part, comprises an antifriction-bearing or roller-bearing receiving section in which the antifriction bearing or roller bearing, preferably a ball bearing [race], is received, a wall receiving section, and a flexible connection section which connects the roller-bearing receiving section gaplessly with the wall receiving section.

In the inserted state of the sealing composed in this manner the roller bearing is seated directly on the shaft and its interior portion can be in connection with it such that it is airtight. Due to their construction, the roller bearings can readily absorb radial loading and ensure the rotatability of the shaft. The wear can, in particular, be further reduced if the roller bearing is not loaded with weight which, in particular, is feasible if the weight of the shaft is borne by the mounting of the components that are connected with one another through the shaft.

Coaxiality and concentricity deviations are absorbed through the one-piece sealing which is enabled in particular thereby that the flexible connection section permits the relative movement between the roller-bearing receiving section and the wall receiving section. Due to the gapless connection between the roller-bearing receiving section and the wall receiving section, the airtightness of the lead-through is simultaneously also ensured.

For reasons of geometry, it is especially advantageous if the roller-bearing receiving section is annular in form.

According to a further development, the roller-bearing receiving section encompasses at its side—inwardly or, stated differently, in the direction toward the shaft—in U-shaped form the outer margin of the roller bearing, which outer margin, after specified normal installation of the lead-through, points away from the shaft and toward the margin of the opening. This can be realized for example thereby that at least this section of the roller bearing is received in a circumferential groove.

In this manner, on the one hand, high sealing tightness against the penetration of air through the connection site between roller bearing and one-piece sealing can be ensured and, at least to some extent, protects the bearing against direct air flow.

On the other hand, in this manner a configuration is accomplished in which the roller bearing, according to an advantageous embodiment, is firmly clamped with the one-piece sealing. For this purpose, the annular groove can comprise a slight undercut such that the bottom of the groove has a length adapted to the length of the roller bearing in the axial direction, however, its inner width tapers in the direction away from the bottom such that the walls of the groove are prestressed against the roller bearing inserted therein.

According to another advantageous embodiment the wall receiving section is annular and preferably comprises at its side facing away from the roller bearing a groove for inserting the margin of the opening of the wall. This has advantages when establishing an airtight connection with respect to the wall since securement bores or securement feet are unnecessary.

This groove can also be shaped such that, according to the same principles as described, a clamping effect is generated between the wall receiving section and the wall.

If, additionally, the wall receiving section, at least in sections, tapers conically, thus if the outer diameter of the ring, which determines the form of the wall receiving section, decreases in the axial direction toward the interior volume of the heating chamber, the lead-through can especially well be inserted into the opening and, in this way, can facilitate the feasibly manual tool-free mounting of the lead-through according to an embodiment.

It is furthermore preferred for the flexible connection section, whose thickness in the axial direction preferably to consist only of a fraction of the thickness of the roller-bearing receiving section and of the wall receiving section, to comprise in the non-loaded state a first segment, which, in the axial direction extends offset relative to a second segment of the connection section, and a third segment which connects the first segment with the second segment and bridges the axial offset.

This results in particular therein that the connection section is longer than the distance between the roller-bearing receiving section and the wall receiving section if these two sections are disposed concentrically with respect to the shaft which, on the one hand, facilitates the compensation of coaxiality and concentricity deviations and, on the other hand, leads to the shaft not being stayed by the bearing and does not lead to dampening of shaft vibration, which also counteracts signs of wear and tear.

In the non-loaded state of the flexible connection section the first segment and the second segment can, in particular, extend substantially in the radial direction and the third segment can substantially extend in the axial direction.

The preferred elastic material of which the one-piece sealing is fabricated is silicone.

The construction according to an embodiment of the lead-through permits in particular that the lead-through in advantageous embodiments is comprised of the roller bearing and the one-piece sealing, thus no further component parts of any kind such as support rings, securement rings, steel springs, flange parts, abutments or securement feet are required.

It is, further, especially advantageous for the wall receiving section to be implemented in the axial direction of such length that it still projects over the roller-bearing receiving section even when the roller-bearing receiving section, as far as the connection section permits, is displaced in the axial direction and/or still projects over it counter to the axial direction when the roller bearing is displaced, as far as the connection section permits, counter to the axial direction.

Thereby mechanical protection is attained in particular for the connection section but also for the roller-bearing receiving section.

The climate chamber according to an embodiment has a wall forming a heating chamber wall and a ventilator disposed on the wall. The ventilator comprises a motor disposed outside of the wall that forms the heating chamber wall. The motor drives a fan impeller across a shaft guided through an opening comprised in this wall. The opening is herein sealed airtight with a lead-through according to an embodiment such that the shaft is guided airtight through the wall.

In the following the application will be described in detail in conjunction with a FIGURE representing an embodiment example. Therein depict:

BRIEF DESCRIPTION OF THE DRAWINGS

FIG. 1: in cross section a lead-through inserted as a ventilator shaft seal for a shaft in the state installed in a climate chamber.

DETAILED DESCRIPTION

FIG. 1 shows a ventilator 10 disposed on a climate chamber of which only a wall 1, the heating chamber wall, is shown, with a motor 11 that drives a fan impeller 13 across a shaft 12 guided through the wall 1. For this purpose the wall 1 comprises an opening that is sealed airtight with a lead-through 100 comprised solely of a roller bearing 110 and a seal 120 such that the shaft 12 is guided airtight through wall 1.

The seal 120 comprises an annular roller-bearing receiving section 121 that encompasses in the form of a U the outer margin 2 facing it of the roller bearing 110 and in this way clamps the roller bearing 110 tightly.

The annular roller-bearing receiving section 121 is connected across a flexible, markedly thinner connection section 122 with a wall receiving section 123, also annular in form, which comprises an annular groove into which the inner margin 2, facing the shaft 12, of the opening engages such that it is secured. To facilitate the insertion of the lead-through 100 into the opening the outer side, facing away from the shaft 12, of the wall receiving section 123 tapers conically in the axial direction A.

In the non-loaded state depicted in FIG. 1 the flexible connection section 122 comprises a first segment 122*a*, which in the axial direction A extends offset relative to a second segment 122*b* of the connection section 122, and a third segment 122*c* which connects the first segment 122*a* with the second segment 122*b* and bridges the axial offset. Accordingly, the length of the entire flexible connection section 122 is greater than the distance between the roller-bearing receiving section 121 and the wall receiving section 123 which enables moving the roller-bearing receiving section 121 relative to the wall receiving section 123 and, in this manner, compensating coaxiality and concentricity deviations. In the non-loaded state of the flexible connection section 122 the first segment 122*a* and the second segment 122*b* herein extend substantially in the radial direction and the third segment 122*c* extends substantially in the axial direction A. The wall receiving section 123 is furthermore implemented in the axial direction A of such length that it still projects over the roller-bearing receiving section 121 counter to the axial direction A when the roller-bearing [receiving] section 121, as far as the connection section 122 permits, is displaced counter to the axial direction A and is thereby mechanically protected.

To guide the shaft 12 rotatable through wall 1 it is received in the roller bearing 110 and connected therewith.

LIST OF REFERENCE SYMBOLS

1 Wall
2 Margin

10 Ventilator
11 Motor
12 Shaft
13 Fan impeller
100 Lead-through
110 Roller bearing
120 Seal
121 Roller-bearing receiving section
122 Connection section
122*a* First segment
122*b* Second segment
122*c* Third segment
123 Wall receiving section
A Axial direction

The invention claimed is:

1. An apparatus, comprising:

a one-piece seal of an elastic material, wherein the one-piece seal is configured for airtight, rotatable guiding of a shaft through an opening of a climate chamber wall, and wherein the one-piece seal comprises:

a roller-bearing receiving section;

a roller bearing connected to the roller-bearing receiving section, wherein the roller bearing receives the shaft;

a wall receiving section;

a flexible connection section which gaplessly connects the roller-bearing receiving section with the wall receiving section; and a ventilator disposed on the climate chamber wall, wherein the ventilator comprises a motor disposed outside of the climate chamber wall and which drives a fan impeller across a shaft guided through the climate chamber wall, wherein the climate chamber wall is sealed airtight with the one-piece seal such that the shaft is guided airtight through the climate chamber wall.

2. The apparatus as in claim 1, wherein the roller-bearing receiving section is annular.

3. The apparatus as in claim 1, wherein a roller bearing facing side face of the roller-bearing receiving section encompasses an outer margin of the roller bearing in the form of a U.

4. The apparatus 1, wherein the wall receiving section is annular.

5. The apparatus 3, wherein a side of the wall receiving section that faces away from the roller bearing comprises a groove for inserting the outer margin in an opening of the wall.

6. The apparatus 1, wherein the wall receiving section, at least in sections, tapers conically.

7. The apparatus 1, wherein the roller bearing is clamped with the roller-bearing receiving section.

8. The apparatus 1, wherein the flexible connection section, in a non-loaded state, comprises a first segment, which extends offset in an axial direction (A) relative to a second segment of the connection section, and a third segment which connects the first segment with the second segment and bridges an axial offset.

9. The apparatus as in claim 8, wherein in the non-loaded state of the flexible connection section, the first segment and the second segment extend substantially in the radial direction and the third segment extends substantially in the axial direction (A).

10. The apparatus as in claim 1, wherein the elastic material is silicone.

11. The apparatus as in claim 1, wherein the connection section connects to the roller-bearing receiving section at a location offset from exterior and interior ends of the roller-bearing receiving section.

12. The apparatus as in claim 8, wherein the wall receiving section is of such length in the axial direction (A) that the wall receiving section projects over the roller-bearing receiving section when the roller-bearing section is displaced, as far as the connection section permits, in the axial direction (A) and/or projects over the roller-bearing receiving section counter to the axial direction (A) when the roller-bearing receiving section is displaced, as far as the connection section permits, counter to the axial direction (A).

\* \* \* \* \*